United States Patent [19]

Banyay et al.

[11] Patent Number: 5,549,941
[45] Date of Patent: Aug. 27, 1996

[54] CRAZE RESISTANT TRANSPARENT SHEET

[75] Inventors: Harold R. Banyay; Michael S. Cholod, both of Bensalem, Pa.; Laurence M. Kolanko, Mt. Holly; Bonnie V. Smith, Magnolia, both of N.J.

[73] Assignee: Atohaas Bolding C.V., Haarlem, Netherlands

[21] Appl. No.: 283,888

[22] Filed: Aug. 1, 1994

Related U.S. Application Data

[63] Continuation-in-part of Ser. No. 145,266, Oct. 29, 1993, abandoned.

[51] Int. Cl.$^6$ .................................................. B29C 39/14
[52] U.S. Cl. ...................... 428/34.1; 428/480; 526/79; 526/309
[58] Field of Search ...................... 428/34.1, 480; 526/79, 309

[56] References Cited

U.S. PATENT DOCUMENTS

| | | | |
|---|---|---|---|
| 3,793,402 | 2/1974 | Owens | 260/876 |
| 4,175,176 | 11/1979 | Ozawa et al. | 526/309 |
| 4,246,382 | 1/1981 | Honda et al. | 526/79 |

FOREIGN PATENT DOCUMENTS

| | | |
|---|---|---|
| 154108 | 11/1985 | European Pat. Off. . |
| 458520 | 11/1991 | European Pat. Off. . |

OTHER PUBLICATIONS

European Search Report dated Jun. 15, 1995.
GB Abstract "Thermoformable Acrylic Sheet".

*Primary Examiner*—Charles Nold
*Attorney, Agent, or Firm*—Richard A. Haggard Patent Agent

[57] ABSTRACT

A melt calendered sheet and a process for making melt calendered sheet having excellent transparency and solvent craze resistance. Clear melt calendered sheet having a critical stress rating above 12,000 KPa, heat distortion temperature above 85° C., and flexural modulus above 3,275 MPa is produced from acrylic copolymer having a melt flow rate of from about 0.3 to about 1.3 grams/10 minutes.

6 Claims, No Drawings

CRAZE RESISTANT TRANSPARENT SHEET

This is a continuation-in-part of application Ser. No. 08/145,226 filed Oct. 29, 1993, now abandoned.

This invention relates to melt calendered sheet having excellent transparency and solvent craze resistance. More specifically, the invention relates to sheet made by extruding and melt calendering an acrylic copolymer derived from methyl methacrylate and an alkyl ester of acrylic acid having a specified melt flow rate; the sheet has a heat distortion temperature above 85° C. and a flexural modulus above about 3,275 megapascals (475,000 pounds per square inch). The sheet has excellent transparency and resistance to solvent crazing, particularly where crazing is aggravated by stress or strain.

Acrylic polymers are widely used in producing sheet having a wide variety of uses related to acrylic properties such as weatherability, clarity, surface hardness, mechanical strength, heat distortion resistance, etc. One problem with sheet made from conventional "melt processible" or "extrusion grade" acrylic polymers, however, is that the resulting sheet is subject to "crazing" or crack formation when it is brought into contact with common solvents such as ethanol, paint thinner, rubbing alcohol (isopropanol), detergents, caustic cleaning compounds, and the like. Conventional acrylic polymers used in making sheet have relatively poor craze or crack formation resistance because, it is believed, certain limitations are imposed on such polymers by the requirements of conventional extrusion and melt calendering processing. These imposed limitations relate most notably to polymer melt viscosity affecting flow and handling, sometimes termed "workability," in extrusion and melt calendering processes. Up to this time, only the very high molecular weight acrylic polymers prepared by cast methods, typically having molecular weights exceeding one million daltons, have demonstrated excellent solvent craze resistance. Cast acrylic polymers, such as those made by cell or continuous casting, have a practical problem, beyond their relatively high production cost, in that their melt flow rate is so low (less than 0.1 g/10 minutes under specified melt-flow measuring conditions, described below, usefully relating to extrusion/melt calendering conditions) that they cannot be extruded and melt calendered to produce sheet—that is, their "melt characteristics" do not permit extrusion and melt calendering. An acrylic polymer having craze resistance approaching that of cast acrylic polymer and which could be extruded and melt calendered to produce sheet would have much value in the industry because it could be used to produce sheet with excellent craze properties more economically than by casting methods.

It is known that resistance to the occurrence of craze or crack formation in the presence of a solvent (hereafter "solvent craze resistance") in an acrylic polymer sheet generally increases as molecular weight ("MW") of the acrylic polymer increases. But, if MW is too high, "workability" of a melted polymer decreases, making melt calendering of sheet difficult if not impossible. Thus, MW cannot be increased without restriction concerning practical processing.

It also is known that the melt viscosity of acrylic polymers derived from methyl methacrylate ("MMA") can be reduced to improve "workability" by copolymerizing the MMA with certain other monomer(s), for example, one or more alkyl acrylate, or other methacrylate, monomers. Melt viscosity also can be reduced by adding one or more of a plasticizer or a lubricant. There is a problem in that either of these melt viscosity reducing methods reduces heat distortion temperature ("HDT") and flexural modulus and thus imposes certain limits on the copolymer ratio or the amount of additive which can be used. Melt calendered acrylic sheet, and the compositions from which it is made, should have an HDT of at least 85° C., preferably 90° C., as measured by ASTM Method D 648, and a flexural modulus of at least 3,275 megapascals (475,000 pounds per square inch, "psi,") as measured by ASTM Method D 790, to meet preferred physical requirements of many acrylic sheet applications.

U.S. Pat. No. 4,246,382 ("'382") discloses a process for producing a solvent craze resistant acrylic resin useful for injection molding. While increased solvent resistance was disclosed in the '382 patent, most exemplified HDT's were substantially below 85° C.; further, achieving excellent craze resistance in a sheet product while simultaneously maintaining excellent optical properties and flexural modulus was not disclosed. Additionally, the practical feasibility of melt calendering to produce a transparent sheet from the "injection moldable composition" of the '382 patent is questionable; "injection moldability" does not necessarily equate with "melt calenderability." Finally, the '382 patent requires a relatively high molecular weight distribution (from 2.3 to 6.0) to achieve a desired improvement in solvent resistance; below 2.3, solvent resistance was not improved.

U.S. Pat. No. 4,175,176 ("'176") disclosed that to provide "haze free" clarity with attendant good solvent resistance in an acrylic copolymer, a three component copolymer composition was required, in which the required third component was methyl acrylate. Melt calenderability, attendant with other desireable sheet properties, was not taught by the '176 patent. Furthermore, only 3 component copolymers having from 80–90 weight percent methyl methacrylate were effective.

Thus, there are known no acrylic copolymers for producing melt calendered sheet which simultaneously provide melt calendering workability and confer to the resulting melt calendered sheet their properties such as HDT above 85° C., a haze value less than 2%, flexural modulus at or exceeding 475,000 psi (3,275 megapascals) and the excellent solvent craze resistance as defined below. Further, a process producing melt calendered sheet from an acrylic copolymer composition having these combined beneficial properties would be a useful and economical contribution to the industry, particularly since craze resistance is deficient in conventional melt calendered sheet and the process of melt calendering is generally known to be lower in cost than other sheet producing methods such as cell casting.

It has been discovered that an acrylic copolymer composition having a specified melt flow rate ("MFR") and of relatively narrow molecular weight distribution can be melt calendered into sheet having the physical and optical properties described immediately above. This composition may be melt calendered into sheet which is transparent (i.e., having a haze value less than 2% in a 3 millimeter, "mm," thickness) and has solvent craze resistance superior to conventional melt calendered sheet. Thus, there is provided a melt calendered sheet having excellent transparency and solvent craze resistance comprising an acrylic copolymer derived from monomer units comprising:

a) from 94.0 to 99.9 weight percent methyl methacrylate; and b) from 0.1 to 6.0 weight percent of at least one monomer selected from an alkyl acrylic ester having from 1 to 12 carbon atoms in the alkyl group; wherein the acrylic copolymer has a melt flow rate of from 0.3 to 1.3 grams/10 minutes, a molecular weight distribution of from 1.7 to 2.2, a heat distortion temperature greater than 85° C., a haze value less than 2.0%, a flexural modulus greater than about 3,275 megapascals, and a critical stress rating greater than 12,000 kilopascals. The quantitative methods for measuring the stated properties are described fully below and are summarized as follows: melt flow rate ("MFR") by ASTM Method D-1238, Cond. "I"; molecular weight distribution by gel permeation chromatography (GPC); heat distortion temperature ("HDT") by ASTM Method D-648; haze value, determined on a 3 mm sheet, by ASTM Method D-1003; flexural modulus, determined on a 3 mm sheet, by ASTM Method D 790; and the critical stress rating ("CSR") by ASTM Method F 791.

There is further provided a method of producing the craze resistant, transparent melt calendered sheet of the invention comprising the steps of:

a) extruding in an extruder at a temperature of from 200° C. to 245° C. an acrylic copolymer derived from monomer units consisting of i) from 94.0 to 99.9 weight percent methyl methacrylate and ii) from 0.1 to 6.0 weight percent of at least one monomer selected from an alkyl acrylic ester having from 1 to 12 carbon atoms in the alkyl group, wherein the acrylic copolymer has a melt flow rate of from 0.3 to 1.3 grams/10 minutes, a molecular weight distribution of from 1.7 to 2.2, a heat distortion temperature greater than 85° C., a haze value less than 2.0%, and a flexural modulus greater than about 3,275 megapascals;

b) conveying the extruded copolymer to a sheet slot die heated to a temperature of from 215° C. to 245° C.;

c) uniformly distributing the conveyed extruded copolymer across the sheet slot die; and d) melt calendering the uniformly distributed copolymer from the sheet slot die on a heated calendering roll stand having at least two calendering rolls within a temperature range from 85° C. to 100° C., yielding the transparent melt calendered sheet having a haze value less than 2.0% and a critical stress rating greater than 12,000 kilopascals.

The melt calendered sheet of the invention is useful in signs, displays, glazing, picture framing, etc. having the improved properties of the sheet. Particularly useful is the improved craze resistant sheet in producing articles by known processes such as by thermoforming, vacuum or pressure forming, strip-heat bending or forming, cold forming, or in parts fabricated using saws, drills, sanders, and the like. Such articles and parts may be used in architectural glazing, automotive accessories such as wind deflectors and side panels, retail store fixtures and cases, outdoor signs (particularly internally illuminated signs), food containers, electronic equipment panels, point of purchase displays, restaurant sneeze shields, lighting fixture diffusers, animal cages, pediatric incubators, and the like.

As discussed above, the essential components of the sheet of the invention are an acrylic copolymer comprising a specific composition having a unique combination of defined physical and optical properties. These are now further defined. The term "polymer" and "copolymer" are used interchangeably here and in the art, and the former term encompasses the latter. As used here and conventionally, the term "acrylic" polymer means a polymer derived from acrylate or methacrylate monomers, or both. The acrylic copolymers used in the sheet of the invention are derived from at least about 94 wt. % methyl methacrylate ("MMA") monomer, based on the copolymer weight. The remainder of the acrylic copolymer composition, from about 0.1 to about 6.0 weight %, is derived from an alkyl acrylate monomer selected from at least one alkyl acrylic ester; the alkyl group may have from 1 to 12 carbon atoms, including all isomers thereof. A preferred alkyl group within the $C_1$ to $C_{12}$ alkyl acrylate monomers includes those alkyl having from 1 to 8 carbon atoms; a more preferred alkyl group has 1 to 4 carbon atoms. Among these, methyl acrylate, ethyl acrylate, normal (n)-butyl acrylate, and 2-ethylhexyl acrylate, are the most preferred monomers due to their cost, availability, and co-polymerization behavior with MMA. Among these, ethyl acrylate is highly preferred. Preferred levels of use for the alkyl acrylate monomers are from about 0.1 to about 4 wt. %; within this range, 0.1 to about 3 wt. % is highly preferred, particularly with the acrylic esters having from 1 to 8 carbon atoms in the alkyl group. (While the features of the invention are achieved with a copolymer comprising only two monomer components, it will be appreciated by those skilled in the art that substitution of a portion of a selected alkyl acrylic ester with a second alkyl acrylic ester, or with other common co-monomers such as styrene, substituted styrenes, or acrylonitrile, may provide similar results in certain instances, and that such substitution would fall within the scope of the invention.)

As used here, the term "molecular weight ('MW')" or "average molecular weight" means "weight average molecular weight," abbreviated "Mw," unless otherwise indicated. Number average molecular weight is abbreviated "Mn." Molecular weight is estimated by conventional gel permeation chromatographic methods, using poly(methyl methacrylate) standards for calibration. The molecular weight distribution ("MWD"), an indicator of polydispersity commonly used in the art, is the ratio of Mw to Mn. All polymers of the invention are within the ratio of 1.7 to 2.2, advantageously providing good melt calendering workability and excellent physical property reproducibility. The term "dalton" means "atomic mass unit." The term "sheet" is used here conventionally, meaning a broad, flat, thin, usually rectangular piece of material, here of the polymer composition described and as produced by the process of extrusion and melt calendering. Sheet thickness may range from about 1 or 2 mm to about 12 or 13 mm; sheet width typically ranges from 1 to several meters, and sheet length is determined by the time and rate of a particular melt calendering run and could be tens of meters. Sheet produced by melt calendering typically is cut to a length of from about one to several meters following cool down.

In general, the acrylic copolymer is a random copolymer which is advantageously prepared via free radical-initiated bulk polymerization of a mixture of the two monomers in a continuous flow, stirred tank reactor ("CFSTR") with an organic peroxide to about 50–60 wt. % conversion. Organic peroxides particularly useful in the preferred 150°–180° C. polymerization range include di-tertiary ("t") butyl peroxide, di-t-amyl peroxide, t-butyl peracetate, t-butyl peroctoate, 2,5-dimethyl-2,5-di(t-butylperoxy)hexane, dicumyl peroxide, di-t-amyl cyclohexanone ketal diperoxide, methylethyl ketone peroxide, and t-butyl perbenzoate. The polymer-monomer mixture is pumped from the CFSTR to a devolatilizing twin-screw extruder where residual monomer is removed and if desired, additives can be added to the melt. The technique for conducting this polymerization is described in the literature and is known to those skilled in the art. Molecular weight may be controlled by known procedures, such as by initiator concentration, by polymerization temperature, by use of mercaptan or other chain transfer agents, and the like. Polymers with MWD in the range of from 1.7 to 2.2 result from this method of preparation. The random copolymer also can be prepared by emulsion, solution, or suspension polymerization methods, so long as the discovered effective melt flow rate range and other required physical/optical properties result. Molecular weight alone, or the Mw to Mn ratio alone, are not exclusively critical factors in the working of the invention; rather, melt flow rate ("MFR"), as described more fully below and as it can be affected by MW, has been discovered to dominate the achievement of excellent craze resistance in the disclosed acrylic polymer compositions. The copolymer can be isolated by conventional methods, such as spray drying or coagulation, washing and the use of drying methods known in the art. Alternatively, the copolymer may be fed directly to the feed end of the extruder of the melt calendering process, described below. The method of preparing the acrylic polymer of the invention is not believed to be critical to the properties achieved so long as the polymer is within the compositional and melt flow rate properties discovered effective, as are described.

"Solvent craze resistance" as used here, and as generally understood in the art is resistance to the generation or formation of micro-cracks (visible under an optical microscope) on or near the surface of a sheet which propagate with time to form larger cracks or crazes, visible to the unassisted eye. Craze is promoted by the presence of one or more solvents, examples of which are mentioned above, and may be further aggravated (increased in rate and extent) by stress, or an imposed strain, on the polymer composition. Stresses and strains may exist particularly in sheet having bends or a small corner radius such as induced by sheet thermoforming, strip heat bending, cold forming, machining, etc., procedures commonly used in the art to shape an article from sheet. Solvent craze resistance may be quantifiably tested and compared among conventional materials and those of the invention. Conventional acrylic polymers available in the industry used in conventional melt calendering of sheet have a critical stress rating ("CSR") for solvent craze resistance of less than 1500 psi (about 10,000 KPa), more usually less than 1300 psi (8,960 KPa). Acrylic polymers made by cast methods, such as Plexiglas® G (batch cell cast) or Lucite L™ (continuously cast), typically exhibit CSR values ranging from about 2000 psi (13,800 KPa) to about 2400 psi (16,550 KPa) under identical test conditions. These cast polymers have average molecular weights greater than 1 million daltons and their superior craze resistance values are believed to be at or near the maximum value which can be achieved by acrylic polymers. Achieving craze resistance near or within the range of cell or continuous cast acrylic polymer CSR values has been a desirable goal for melt calenderable acrylic polymers. The sheet of the invention has a CSR for solvent craze resistance which is at least 1750 psi (12,000 KPa); preferred sheet exceeds 1900 psi (ca. 13,000 KPa) and most preferred sheet exceeds 2,000 psi (ca. 13,700 KPa). Critical stress rating is measured by procedures defined in detail in the Examples below. "Excellence" in craze resistance is thus defined by a CSR value exceeding 1750 psi (12,000 KPa), measured by these procedures. The CSRs for the compositions and sheet of the invention all exceed this value and indeed may approach the CSR values attained by cell cast acrylic polymers. It is a feature of the invention that the improved sheet advantageously attains these excellent levels with molecular weights of less than 250,000 daltons, far below cell or continuous cast MW levels, within the discovered range of melt calendering melt flow.

"Transparency" is quantified by measurement of haze under standard conditions, defined below, and is considered "excellent" when measured values through a 3 mm thick sample are less than 2%, preferably less than 1.5%, and most preferred, less than 1.0%. The compositions and sheet of the invention all have haze values less than 2%. Heat distortion temperature of composition and sheet of the invention is at least 85° C., thus providing continuous service temperature to sheet in applications such as fluorescent lighting, outdoor lighting and other applications where temperatures above ambient are present and resistance to distortion at use temperatures is needed. Flexural modulus of the inventive materials is at least 3,275 megapascals, thus providing useful rigidity needed for many glazing and sign applications; the higher the flexural modulus, the greater the rigidity.

Melt flow rate ("MFR") is a reproducibly measureable characteristic of a polymer or copolymer; its units are grams of polymer which flow during a stated time period through a fixed orifice under specified conditions. The MFR of an acrylic copolymer may be influenced by physical factors (e.g. temperature, flow aperture size and shape, polymer glass transition temperature ("Tg"), degree of crystallinity, polymer MW) and chemical factors (e.g. polymer composition, presence of additives, polymer conformation). Speaking broadly of those factors most material to the invention, MFR is inversely related to average molecular weight and to melt viscosity; generally, higher average molecular weight or higher average melt viscosity yields lower MFR, all other factors being equal. It is stated again that, although molecular weight is an important factor, it is not the sole factor in determining the MFR discovered to be critical to the invention. Polymer composition is an additional critical factor which, with molecular weight, is manipulated within the previously defined boundaries to afford the transparency, melt calenderability, craze resistance and other properties of the invention. Concerning compositional effects on MFR, the MFR of a methyl methacrylate-rich copolymer relates directly to acrylic monomer content of the copolymer; generally, increasing the level of an acrylic co-monomer increases the MFR, all other factors being equal. Manipulation of acrylic content and molecular weight to provide an MFR range which is both melt calenderable and yielding of the described physical and optical properties is highly related to the working of the invention.

The acrylic copolymer MFR range which has been discovered to yield the unexpected properties in melt calendered sheet of the invention is from about 0.3 to about 1.3 grams (g.)/10 minutes (min.), as measured by ASTM Method, Condition "I." A preferred MFR range for the acrylic polymer is from about 0.3 to about 0.8 g./10 min., and a most preferred range is from about 0.4 to about 0.6. g./10 min. These ranges are so preferred because they offer increasingly better compromises of craze resistance and melt calenderability; a MFR at about 0.5 g./ 10 min. appears to be optimum. Generally speaking, lower MFR yields better craze resistance and higher MFR gives more facile extrusion and melt calendering workability, or processibility, and consequently faster production rates.

Melt calendering processes for continuously producing conventional sheet are generally known in the art. Extruding and melt calendering the copolymer of the invention to provide a transparent sheet having the excellent craze resistance and attendant properties of the invention is described by the following process. An acrylic resin copolymer of the invention is conveyed, typically by an air conveyer, to a desiccated hot air bed drier and dried at about 80° C. (180° F.) for about 4 hours. The dried resin (or alternatively, the acrylic copolymer in melt form, as obtained directly from a devolatilizing extruder following preparation of the copolymer in a reactor) is conveyed and fed via metering equipment to the feed section of an extruder. The extruder may be of the single screw type. In the extruder, the acrylic resin is melted (if fed from the solid form) or retained as a melt (if fed directly as a melt) by heat provided from electrical heater bands, by pressure and by shear within the operating extruder. To produce sheet with minimum surface defects attributed to volatiles, residual monomer(s) in the feed polymer should be low, no more than 0.6 wt. %, preferably below 0.5% of the polymer weight. The resulting polymer melt containing low residual monomer is conveyed through the extruder by a screw, the speed (rpm) of which can be varied to adjust output rate necessary for accommodating different sheet thicknesses. During extrusion, residual volatiles (such as moisture and remaining residual monomer) from the polymer are vented off using a water sealed vacuum pump. Effective temperatures of extrusion are in the range of 200°–245° C. (390°–470° F.). The molten polymer exiting the front end of the extruder is forced under pressure to provide an even flow into a sheet slot die heated at 215°–245° C. (420°–470° F.). The sheet slot die has variable thickness and width control and thermal control. The molten polymer is uniformly distributed across the width of the die. Molten polymer uniformly exits the sheet slot die and is immediately melt calendered on two or more heated, highly polished steel or chrome-plated steel calendering rolls retained in a calendering roll stand. The sheet is gauged and polished as it progresses along the calendering rolls. The temperature of the calendering rolls is within the range of from about 85° C. (185° F.) to about 100° C. (210° F.). The sheet is then pulled over a series of idler rollers on which the sheet cools. At the end of the line, protective sheet masking is applied, if desired, and the sheet is cut into its final dimensions and stacked.

The acrylic copolymer of the invention also may be coextruded with other thermoplastic materials. For example, a clear sheet product may be made by the coextrusion of a top layer of the acrylic copolymer over a substrate polymer such as another acrylic polymer, i.e. a conventional acrylic sheet, to produce a sheet with a top surface resistant to crazing and chemical attack. Other thermoplastic substrates include polycarbonate, polyester-polycarbonate, polysulphones, amorphous polyesters, and styrenic copolymers exhibiting adhesion to the coextruded acrylic copolymer top layer. Similarly, opaque sheet may be produced by coextrusion of the craze-resistant acrylic copolymer with opaque substrate polymers such as acrylonitrile-butadiene-styrene ("ABS") resin, ABS-acrylic blends, polyvinylchloride ("PVC"), PVC-acrylic blends, and the like. Multilayer sheet having 3 and more components similarly may be prepared having a coextruded top layer of the craze resistant copolymer. Useful applications from such multilayered sheet are exemplified by sanitaryware articles, swimming pool accessories, and construction and marine products.

Certain additives may be added before or during the extrusion stage during melt calendered sheet production. Additives may include impact modifying polymers, for example, impact modifiers as described in U.S. Pat. No. 3,793,402 ("'402"). Although impact modifiers of this type tend to reduce flexural modulus when present in the sheet resin, impact-modified sheet of the invention has flexural modulus greater than 300,000 psi (2,070 Mpa). For example, a clear, craze-resistant-improved impact modified sheet comprising 55 wt. % of Example 6 (below) and 20 wt. % of the acrylic impact modifier closely represented by Example 3 of the '402 patent, had a flexural modulus of 386,000 psi (2,660 Mpa). Examples of other additives include lubricants, such as stearic acid; toners, colorants, stabilizers such as ultraviolet and thermal stabilizers, acrylic thermoplastic polymers, drying aids, and the like, all known and used in the sheet-making art.

EXAMPLES

General

Heat distortion temperature (HDT) was measured by ASTM Method D-648 at a test load of 264 psi (1820 KPa) at the rate of 2 C.° per min.

Critical stress rating (CSR) for solvent craze resistance, generally termed critical stress craze resistance, as described above, was measured by the procedures of ASTM Method F 791-82. CSR is reported in this method as the "critical crazing stress." Isopropanol was the solvent used. All test specimens were pre-conditioned as follows: specimens were dried and preconditioned in an oven for 12 hours at 82° C. (180° F.), cooled to ambient temperature and then immersed in a water bath at ambient temperature for 24 hrs. Each specimen then was removed from the water bath, toweled dry, and the CSR rating determined within 1.75 to 2.25 hours following removal from the water bath. The CSR was reported as the critical crazing stress in pounds per square inch (and in Pascals).

Molecular weight was measured by poly(MMA)-calibrated gel permeation chromatography ("GPC"); values for Mw and Mn were obtained and the ratio (MWD) calculated. Residual monomer was determined by conventional gas-liquid chromatography ("GLC") using a flame-ionization detector. A test sample was dissolved in a solvent containing an internal standard; concentration was determined relative to standard by peak height ratio to the internal standard. Estimates of copolymer content (e.g. wt. % acrylic comonomer from which a copolymer was derived) were made from synthesis feed composition and reaction conditions (for the synthesized samples) and by pyrolytic GLC (on samples of commercial acrylic polymers) versus GLC standards.

Transparency was quantified by measuring the "% haze" of sheet having a thickness of approximately 3 mm using ASTM Method D-1003.

Melt flow rate was measured by ASTM Method D-1238, Condition "I," run at 230° C. with a 1.2 Kg mass.

Flexural modulus was measured by ASTM Method D 790, using a 16:1 span depth ratio.

All test specimens were pre-conditioned for 40 hours at 23° C., 50% r.h., unless otherwise indicated (e.g., special conditions for CSR measurement).

In the following examples, compositions of a copolymer may be described by conventional nomenclature, such as 92 MMA/8 EA, where the number represents % by weight of the stated monomer from which the copolymer was derived, such as 92 wt. % of methyl methacrylate; the "/" merely separates these descriptive terms.

Comparative Examples

Commercially available or otherwise known acrylic compositions used for conventional sheet product manufacture are described here as comparative samples C-1 through C-6. Their properties known or determined are stated. Table I contains a summary of the data for sheet of these comparative examples, each of which shows deficiencies in one or more properties, particularly all having craze resistance less than or about 10,000 KPa, in comparison with sheet of the invention exemplified further below.

C-1 An acrylic copolymer of 85 MMA/15 ethyl acrylate (EA)

A random copolymer having Mw of 210,000, 15 wt. % EA (the balance, MMA), and a MFR of 5.0 was derived from a monomer mixture of 85 MMA/15 EA. It was prepared by the procedures of Example 1A and formed into a press polished sheet by the procedures of Example 1B. The critical stress rating (CSR) on sheet so prepared was 1075 psi (7412 KPa); other measured properties are summarized in Table I.

C-2 A Commercial Melt Calendered Sheet, 95.5 MMA/4.5 MA

A sheet commercially available as "Acrylite™ FF" (Cyro Corporation) was analyzed as a random copolymer of MMA/methyl acrylate (MA) having Mw about 143,000, about 4.5% MA, and a MFR of 2.7. The CSR was 1250 psi (8620 KPa); other measured properties are summarized in Table I.

C-3 A Commercial Melt Calendered Sheet, 95 MMA/5 EA

A sheet commercially available as "Plexiglas® MC" (AtoHaas North America Inc.) was analyzed as a random copolymer of MMA/EA having Mw 155,000, about 5% EA, and a MFR of 2.0. The CSR was 1300 psi (8963 KPa); other measured properties are summarized in Table I.

C-4 A Commercial Melt Calendered Sheet, 95.5 MMA/4.5 MA

A sheet commercially available as "Perspex™ CP" (ICI Corp.) was analyzed as a random copolymer of MMA/MA having Mw 143,000, about 4.5% MA, and a MFR of 2.1,. The CSR was 1300 psi (8963 KPa); other measured properties are summarized in Table I.

C-5 A Commercial Pellet Composition, 95.5 MMA/4.5 EA

A random copolymer, commercially available as "Plexiglas® VO44 Acrylic Resin" (AtoHaas North America Inc.) having Mw 135,000, about 4.5% EA content, and a MFR of 2.3, was converted to a press polished sheet by the procedures of Example 1B. The CSR of the resultant sheet was 1450 psi (10,000 KPa); other measured properties are summarized in Table I.

C-6 A Commercial Melt Calendered Sheet, 95 MMA/4 EA/1 MA

A sheet commercially available as "Optix"™ (Plaskolite Corp.) was analyzed as a random copolymer having Mw 153,000, derived from about 4% EA and 1% MA, and had a MFR of 1.7. The CSR was 1350 psi (9308 KPa); other measured properties are summarized in Table I.

Example 1

A. Acrylic Copolymer Having MFR 1.0; Composition 97 MMA /3 EA

A pelletized acrylic copolymer derived from MMA and ethyl acrylate (EA) was prepared by the CFSTR procedure previously described. A feed mix containing MMA and EA in the ratio 97.0/3.0 and containing 0.2% n-dodecyl mercaptan chain transfer agent was polymerized in a CFSTR under free radical polymerizing conditions at 160° C. until converted to about 58 wt. % polymer. The partially converted reaction mixture from the reactor was devolatilized in a twin screw extruder to a level of 0.4% residual MMA monomer and cut into pellets. Analysis of the dried pellets revealed the acrylic copolymer to have an MFR of 1.0 and Mw 188,000, Mn 110,00 (MWD 1.7), summarised in Table II.

B. Laboratory Extruded, Press Polished Sheet

A portion of the dried pellets from A. were extruded into sheet using the following procedures. The pellets were dried in an air circulating oven at 82° C. overnight (at least 12 hours) and fed to a non-vented, single screw laboratory extruder (a 2.5 cm., 1 inch, Killion extruder) having 3 temperature zones ranging from 220° to 230° C. The polymer was melted and conveyed through an adaptor heated at 230° C. into a sheet slot die of 20 cm (8 inch) width heated at 218°–221 ° C. Molten polymer exited the die at a polymer melt temperature of 232°–240° C. onto two stainless steel polishing rolls heated at 88°–104° C., where sheet was polished, guaged to 3 mm, and cooling initiated. Sheet cooling continued down the remaining length of line where samples were cut for evaluation.

Portions of the sheet so obtained were press polished using the following procedure. Pieces of sheet sized approximately 15 cm (6 inch) square were placed between 2 polished stainless steel platens in a heated press held at 135° C. (275° F.). The press was closed at a pressure of 10,000 psi (69 MPa) and held at pressure for 30 seconds,

TABLE I

Summarized Comparative Data for Sheet of Examples C-1–C-6

| Example | MFR | Mw (× 10⁻³) | Mn | MWD (Mw/Mn) | Wt. % Acrylic Comonomer | Craze Resistance[1] | % Haze[2] | HDT[3] | Flex. Modulus[4] |
|---|---|---|---|---|---|---|---|---|---|
| C-1 | 5.0 | 210 | 116 | 1.8 | 15% EA | 1075(7400) | 1.4 | 70 | 487(3360) |
| C-2 | 2.7 | 143 | | | 4.5% MA | 1250(8600) | 1.0 | 85 | 450(3100) |
| C-3 | 2.0 | 155 | 74 | 2.1 | 5.0% EA | 1300(8960) | 0.5 | 85 | 453(3120) |
| C-4 | 2.1 | 143 | | | 4.5% MA | 1300(8960) | 1.0 | 86 | 450(3100) |
| C-5 | 2.3 | 135 | 68 | 2.0 | 4.5% EA | 1450(10,000) | ND | ND | 480(3310) |
| C-6 | 1.7 | 153 | | | 4% EA/1% MA | 1350 | 1.0 | 86 | 453(3120) |

Notes:
[1]CSR, in psi (Kpa); measured by ASTM F 791 on test specimens as described.
[2]In percent haze, on 3 mm sheet, as measured by ASTM Method D-1003.
[3]In °C., as measured by ASTM Method D-648.
[4]In Kpsi (Mpa); as measured by ASTM Method D-790 on 3 mm sheet.

following which the press was opened and the press polished sheet sample removed and cooled for further testing.

Sheet of this Example showed a % haze of 0.6% and had a CSR of 1800 psi (12,400 KPa); other properties are summarized in Table II.

C. Plant-scale Melt Calendered Sheet

A portion of the acrylic copolymer pellets from 1.A. was melt calendered into sheet by the plant scale procedure previously described. Thus, the pellets were air dried at 82° C. (180° F.) for 4 hours and fed to a single screw extruder having barrel temperature within the range of 200°–245° C. The polymer was melted and downstream ventedat about 10 KPa (3 inches of Hg) pressure, removing traces of volatiles. The devolatilized polymer melt was extruded and conveyed under pressure, at a melt temperature of 238° to 254° C. (460° to 490° F.), to a die lip held at 215° C. (420° F.) in the center and 243° C. (470° F.) on the left and right edges; the melt passed through the die, exiting to a series of calendering rolls held at temperatures increasing from 85° C. (185° F.) to 98° C. (208° F.). During calendering, the sheet so formed was polished and gauged, and cooling was initiated. Sheet cooling continued down the remaining length of the line.

Test results of the 97 MMA/3 EA composition in melt calendered sheet form showed that the haze value was 0.5%, HDT was 87° C., and the critical stress craze resistance test yielded a CSR of 1800 psi (12,410 KPa). Flexural modulus was 3275 megapascals; these properties are summarized in Table II. Example 1.C. results versus the Ex. 1B (laboratory) results confirmed the utility of laboratory sheet tests in projecting scaled-up plant melt calendering results.

Example 2

A. Acrylic Copolymer Having MFR 0.8; 99.5 MMA/0.5 EA

An acrylic polymer derived from an MMA/EA composition was made by the procedures described in Example 1A, using a charge equivalent to 99.5% MMA and 0.5 wt. % EA, and 0.2% n-dodecyl mercaptan. Analysis of the dried pellets revealed the acrylic copolymer to have an MFR of 0.8 and Mw 175,000, Mn 103,000 (MWD 1.7) and a residual monomer content of 0.6% (Table II).

B. Laboratory Extruded, Press Polished Sheet

A portion of the dried pellets from 2. A. was extruded into sheet using the laboratory procedures of Ex. 1B. Press polished sheet so prepared showed a % haze of 0.3% and had a CSR of 1950 psi (13,400 KPa); other properties are summarized in Table II.

C. Plant-scale Melt Calendered Sheet

Procedures for producing melt calendered sheet on a plant scale from a portion of the pellets from Ex. 2A were essentially identical to those described for Ex. 1C. Test results of the sheet of this Example showed that the haze value was 1.2%, HDT was 87° C., and the CSR was 1950 psi (13,400 KPa). These and other properties are summarized in Table II.

Example 3

A. Acrylic Copolymer Having MFR. 0.8, Composition 99 MMA/1 EA

An acrylic copolymer derived from 99% MMA and 1 wt. % EA monomer mix composition was made by the procedures described in Example 1A, using a feed mix containing MMA and EA in the ratio 99 MMA/1 EA and 0.2% n-dodecyl mercaptan. Analysis of the dried pellets revealed the acrylic copolymer to have an MFR of 0.8, Mw 164,000, Mn 96,000 (MWD 1.7), and a residual monomer content of 0.3%.

B. Laboratory Extruded, Press Polished Sheet

A portion of the dried pellets from 3.A. was extruded into sheet using the procedures of Ex. 1B. Press polished sheet so prepared showed 0.9% haze and a CSR of 1750 psi (12,000 KPa); other properties are summarized in Table II.

Example 4

A. Acrylic Copolymer Having MFR 0.6; Composition 98 MMA/2% 2-EHA

An acrylic copolymer derived from 98% MMA and 2 wt. % 2-ethylhexyl acrylate (2-EHA) composition was made by the procedures described in Example 1A, using a feed mix containing MMA and 2-EHA in the ratio 98 MMA/2 2-EHA and 0.16% normal dodecyl mercaptan. Analysis of the dried pellets revealed the acrylic copolymer to have a MFR of 0.59 and a residual monomer content of 0.6%.

B. Laboratory Extruded, Press Polished Sheet

A portion of the dried pellets from 4.A. was extruded into sheet using the procedures of Ex. 1B. Press polished sheet so prepared showed a % haze of 1.22% and had a CSR of 2125 psi (14,650 KPa); other properties are in Table II.

Example 5

A. Acrylic Copolymer Having MFR 0.4; Composition 96 MMA/4 EA

An acrylic copolymer derived from 96% MMA and 4 wt. % EA composition was made by the procedures described in Example 1A, using a feed mix containing MMA and EA in the ratio 96 MMA/4 EA and 0.12% normal dodecyl mercaptan. Analysis of the dried pellets revealed the acrylic copolymer to have an MFR of 0.4, Mw 220,000, Mn 116,000 (MWD 1.8), and a residual monomer content of 0.5% (Table II).

B. Laboratory Extruded, Press Polished Sheet

A portion of the dried pellets from 5. A. was extruded into sheet using the procedures of Ex. 1B. Press polished sheet so prepared showed a % haze of 1.48% and had a CSR of 2000 psi (13,800 KPa) (Table II summarizes these and other properties).

Example 6

A. Acrylic Copolymer Having MFR 0.5; Composition 98 MMA/2 EA

An acrylic copolymer derived from 98% MMA and 2 wt. % EA composition was made by the procedures described in Example 1A, using a feed mix containing MMA and EA in the ratio 98 MMA/2 EA and 0.16% normal dodecyl mercaptan. Analysis of the dried pellets revealed the acrylic copolymer to have an MFR of 0.5, Mw 188,000, Mn 105,000 (MWD 1.8). and a residual monomer content of 0.3%.

B. Laboratory Extruded, Press Polished Sheet

A portion of the dried pellets from 6.A. was extruded into sheet using the procedures of Ex. 1B. Press polished sheet so prepared showed a % haze of 1.1% and had a CSR of 1900 psi (13,100 KPa); flexural modulus was 494,000 psi (3,410 Mpa) (Table II).

Example 7

A. Acrylic Copolymer Having MFR 0.5; Composition 98 MMA/2 BA

An acrylic copolymer derived from 98% MMA and 2 wt. % n-butyl acrylate (BA) composition was made by the procedures described in Example 1A, using a feed mix containing MMA and BA in the ratio 98 MMA/2 BA and 0.16% normal dodecyl mercaptan. Analysis of the dried pellets revealed the acrylic copolymer to have an MFR of 0.5, Mw 190,000, Mn 106,000 (MWD 1.8), and residual monomer, 0.5% (Table II).

B. Laboratory Extruded, Press Polished Sheet

A portion of the dried pellets from 7.A. was extruded into sheet using the procedures of Ex. 1B. Sheet so prepared had a CSR of 2125 psi (14,650 KPa); haze, HDT, and flexural modulus were not measured due to limited sample size, (Table II).

Example 8

A. Acrylic Copolymer Having MFR 0.44; Composition 99 MMA/1 MA

An acrylic copolymer derived from 99% MMA and 1 wt. % methyl acrylate (MA) composition was made by the procedures described in Example 1A, using a feed mix containing MMA and MA in the ratio 99 MMA/1 MA and 0.16% normal dodecyl mercaptan. Analysis of the dried pellets revealed the acrylic copolymer to have an MFR of 0.44, Mw of 186,000 and a residual monomer content of 0.4%.

B. Laboratory Extruded, Press Polished Sheet

A portion of the dried pellets from 8.A. was extruded into sheet using the procedures of Ex. 1B. Sheet so prepared showed a % haze of 1.06% and had a CSR of 2100 psi (14,500 KPa); other properties of the copolymer and resulting sheet are summarized in Table II.

The results described above and as summarized in Table II, based on the illustrative examples of sheet composition and processes, show the excellent craze resistance and clarity achieved in the melt calendered sheet of the invention in combination with other defined and useful physical properties. While the invention has been described with reference to specific examples and applications, other modifications and uses of the invention will be apparent to those skilled in the art without departing from the spirit and scope of this invention as defined in the claims.

TABLE II

Summarized Data for Sheet of Examples 1–8

| Example | MFR | Mw ($\times 10^{-3}$) | Mn | MWD (Mw/Mn) | Wt. % Acrylic Comonomer | Craze Resistance[1] | % Haze[2] | HDT[3] | Flex. Modulus[4] |
|---|---|---|---|---|---|---|---|---|---|
| 1B | 1.00 | 188 | 110 | 1.7 | 3.0% EA | 1800(12,400) | 0.60 | 87 | 487(3360) |
| 1C | " | " | " | 1.7 | " | 1800(12,400) | 0.50 | " | 475(3275) |
| 2B | 0.80 | 175 | 103 | 1.7 | 0.5% EA | 1950(13,400) | 0.3 | 88 | 490(3380) |
| 2C | " | " | " | 1.7 | " | 1950(13,400) | 1.2 | 87 | 475(3275) |
| 3B | 0.80 | 164 | 96 | 1.7 | 1.0% EA | 1750(12,000) | 0.9 | 93 | 494(3410) |
| 4B | 0.59 | 190 | 106 | 1.8 | 2.0% 2-EHA | 2125(14,650) | 1.22 | 86 | 507(3490) |
| 5B | 0.40 | 210 | 116 | 1.8 | 4.0% EA | 2000(13,800) | 1.48 | 87 | 506(3490) |
| 6B | 0.50 | 188 | 105 | 1.8 | 2.0% EA | 1900(13,100) | 1.10 | 92 | 494(3410) |
| 7B | 0.51 | 190 | 106 | 1.8 | 2.0% BA | 2125(14,650) | ND | ND | ND |
| 8B | 0.44 | 186 | 109 | 1.7 | 1.0% MA | 2100(14,500) | 1.06 | 92 | 483(3330) |

Notes:
[1]CSR, in psi (Kpa); measured by ASTM F 791 on test specimens as described.
[2]In percent haze, on 3 mm sheet, as measured by ASTM Method D-1003.
[3]In °C., as measured by ASTM Method D-648.
[3]In Kpsi (Mpa); as measured by ASTM Method D-790 on 3 mm sheet.

We claim:

1. A melt calendered sheet having excellent transparency and solvent craze resistance comprising an acrylic copolymer derived from monomer units comprising:

a) from about 94.0 to about 99.9 weight percent methyl methacrylate; and b) from about 0.1 to about 6.0 weight percent of a monomer selected from an alkyl acrylic ester having from 1 to 12 carbon atoms in the alkyl group; wherein the acrylic copolymer has a melt flow rate of from about 0.3 to about 1.3 grams/10 minutes, a molecular weight distribution of from 1.7 to about 1.8, a heat distortion temperature greater than about 85° C., a haze value less than 2.0%, a flexural modulus greater than about 3,275 megapascals, and a critical stress rating greater than 12,000 kilopascals.

2. The melt calendered sheet of claim 1 wherein the alkyl acrylic ester is selected from methyl acrylate, ethyl acrylate, n-butyl acrylate, or 2-ethylhexyl acrylate.

3. The melt calendered sheet of claim 1 wherein the acrylic copolymer melt flow rate is from 0.4 to 0.8 grams/10 minutes and the critical stress rating is greater than 13,000 kilopascals.

4. The melt calendered sheet of claim 3 further wherein the acrylic copolymer melt flow rate is from 0.4 to 0.6 grams/10 minutes and the critical stress rating is greater than 13,700 kilopascals.

5. An article produced from the melt calendered sheet of claim 1 by the method of thermoforming, vacuum forming, cold forming, pressure forming, or stripheat bending.

6. An article produced from the melt calendered sheet of claim 5 selected from an outdoor sign, an automotive accessory, a food container, an electronic equipment panel, a restaurant sneeze shield, a lighting fixture diffuser, or a pediatric incubator.

* * * * *